United States Patent [19]
Curicuta et al.

[11] Patent Number: 5,586,714
[45] Date of Patent: Dec. 24, 1996

[54] METHOD OF BONDING METAL TO A NON-METAL SUBSTRATE

[75] Inventors: Victor Curicuta; Dennis R. Alexander; Robert J. Deangelis; Brian W. Robertson, all of Lincoln, Nebr.

[73] Assignee: Board of Regents of the University of Nebraska, Lincoln, Nebr.

[21] Appl. No.: 319,014

[22] Filed: Oct. 6, 1994

[51] Int. Cl.$^6$ .................................................. B23K 26/00
[52] U.S. Cl. .................................. 228/122.1; 219/121.64
[58] Field of Search ................... 228/122.1; 219/121.64

[56]  References Cited

U.S. PATENT DOCUMENTS

| | | | |
|---|---|---|---|
| 3,766,634 | 10/1973 | Babcock et al. | 228/122.1 |
| 3,994,430 | 11/1976 | Cusano et al. | 228/122.1 |
| 4,505,418 | 3/1985 | Neidig et al. | 228/122.1 |
| 4,849,292 | 7/1989 | Mizunoya et al. | 228/122.1 X |
| 5,280,850 | 1/1994 | Horiguchi et al. | 228/122.1 |

*Primary Examiner*—Kenneth J. Ramsey
*Attorney, Agent, or Firm*—James D. Welch

[57]  ABSTRACT

A method of bonding metal to a non-metal substrate. The process includes placing the metal in contact with a non-metal substrate and blanketing the contact region with a gaseous atmosphere in which the amount of reactive gas is limited to minimize oxidation of the metal at the surface. Heating of the metal is accomplished by various means including a laser beam. The metal is heated to a point where the reactive gas and metal form a eutectic that wets the contact area between the metal and non-metallic substrate. Upon cooling, the metal and non-metallic substrate are bonded together over a substantial part of the contact area.

13 Claims, 9 Drawing Sheets

METHOD OF BONDING METAL TO A NON-METAL SUBSTRATE

TECHNICAL FIELD

This invention relates to material bonding techniques, and more particularly to a method of bonding metal to a non-metal substrate.

BACKGROUND ART

The numbers in brackets below refer to references listed in the Appendix, the teachings of which are hereby incorporated by reference.

There has been a great deal of interest in the successful bonding of metallic sheet to ceramic substrates driven by the several potential applications in the market for medium and high power storage and circuit devices. One known bonding method comprises placing a metal member such as copper in contact with a non-metallic substrate such as alumina, heating in a furnace to a temperature slightly below the melting point of metal (e.g. between approximately 1,065° and 1,080° C. for copper), the heating being performed in a reactive gaseous atmosphere, such as an oxidizing atmosphere, for a sufficient time to create a copper-copper oxide eutectic melt, in the copper/oxygen case, which, upon cooling, bonds the metal to the substrate. Gas flow rates used are approximately two cubic feet per hour of argon-oxygen gas mixture. Approximately one cubic foot per hour of the argon-oxygen gas mixture produces a total oxygen content in the combined gases of approximately 0.04 molar percent [1]. This method was later improved with a reaction atmosphere between 0.01 and 0.5 a.w. % oxygen in nitrogen [2]. In both situations, the big problem was the oxidation and precipitation of copper oxide in the bonded member. To eliminate this problem, it was proposed to heat the copper and ceramic in a vacuum at a pressure no greater than one millibar and a partial oxygen pressure between 0.001 and 0.1 mbars, with the oxygen pressure under 0.005 mbars at the time of cooling [3]. This, however, requires expensive equipment and a control over the oxygen partial pressure.

No literature references have been found regarding the use of lasers to promote bonding of metal to ceramic materials; however, the known literature contains information about heat flow and heat conduction where a laser beam heat source is used. Two models have been previously reported; the hyperbolic model that predicts a severe thermal wavefront at the surface and the parabolic model that predicts a continuous temperature rise followed by diffusion of heat into the medium when the pulsed train is deactivated. In fact, the differences between the hyperbolic and parabolic models become less extreme as the pulse frequency decreases [4–6]. An investigation of the laser weldability of copper employing thin layers of TiO, colloidal graphite and Cr was reported by Daurelio and Ammannati [7]. Their results indicated the importance of employing an absorption coating during the laser processing of copper. Other investigators reported the relationship between the growth kinetics of oxide films and their effect on the absorption of radiation during laser heating [8–10]. Nonuniformity in heating the oxide film at high incident radiation intensities, and significant temperature gradients in the oxide layer are capable of producing cracking of the oxide coating and peeling from the metal surface, which may in turn degrade heat removal from the oxide film in the metal substrate [11]. In the known literature [12] it is stated "in general a suitable ceramic for laser machining must possess low parameters of elasticity and thermal expansion as well as high breaking strength and a high heat and thermal conductivity".

Those concerned with these and other problems recognize the need for an improved method of bonding metal to a non-metal substrate.

DISCLOSURE OF THE INVENTION

The present invention provides a method of bonding metal to a non-metal substrate. The process includes placing the metal in contact with a non-metal substrate and blanketing with a gaseous atmosphere where the amount of reactive gas is limited to minimize oxidation of the metal at the surface. Heating the metal is accomplished by various means including a furnace microwave cavity and laser beam heating and combinations of all these means. The metal is heated to a temperature at which the reactive gas and metal form a eutectic that bonded together over the contact area between the metal and non-metallic substrate. Upon cooling, the metal and non-metallic substrate are bonded together over a substantial part of the contact area.

The process produces continuous interfacial bonding between metallic and non-metallic materials. In this process, the heating rate, the reaction temperature range, and the cooling rate of the metallic and ceramic reactants are controlled, while the reactants are sufficiently enclosed to permit simultaneous control of the composition and flow rate of reactive gases in the region between the ceramic and the metallic reactants. The process of bonding occurs because the chemistry at the surface of the metal is controlled to produce wetting in the contact region between the metal and the ceramic material. This process is applicable to a combination of metals with ceramics, in which a certain atmosphere enables appropriate wetting conditions for the bonding to occur.

An object of the present invention is the provision of an improved method of bonding metal to a non-metal substrate.

Another object is to provide a method of bonding metal to a non-metal substrate wherein the oxidation of the metal at the surface is minimized.

A further object of the invention is the provision of a method of bonding metal to a non-metal substrate wherein the need for a vacuum processing chamber is eliminated.

BRIEF DESCRIPTION OF THE DRAWINGS

These and other attributes of the invention will become more clear upon a thorough study of the following description of the best mode for carrying out the invention, particularly when reviewed in conjunction with the drawings, wherein:

FIGS. 4 and 5a are schematic drawings illustrating alternate equipment arrangements for pattern bonding using a laser beam;

FIG. 5b is an enlarged section taken at a—a in FIG. 5a;

BEST MODE FOR CARRYING OUT THE INVENTION

The following examples are illustrative of the best mode for carrying out the invention. They are obviously not to be construed as limiting of the invention since various other embodiments can readily be evolved in view of the teachings provided herein.

EXAMPLE 1

Example 1 describes a method to improve the direct bonding of copper to alumina ceramic using a furnace, a low percentage of oxygen in nitrogen or argon, about 0.0001–0.001 molar percent, a gas flow rate of 1.4 l/hr., a gas pressure at 15 lbs./in$^2$. and a short cooling time of about 25 minutes or less, with no evidence of copper oxidation after the bonding process.

Figure 1:
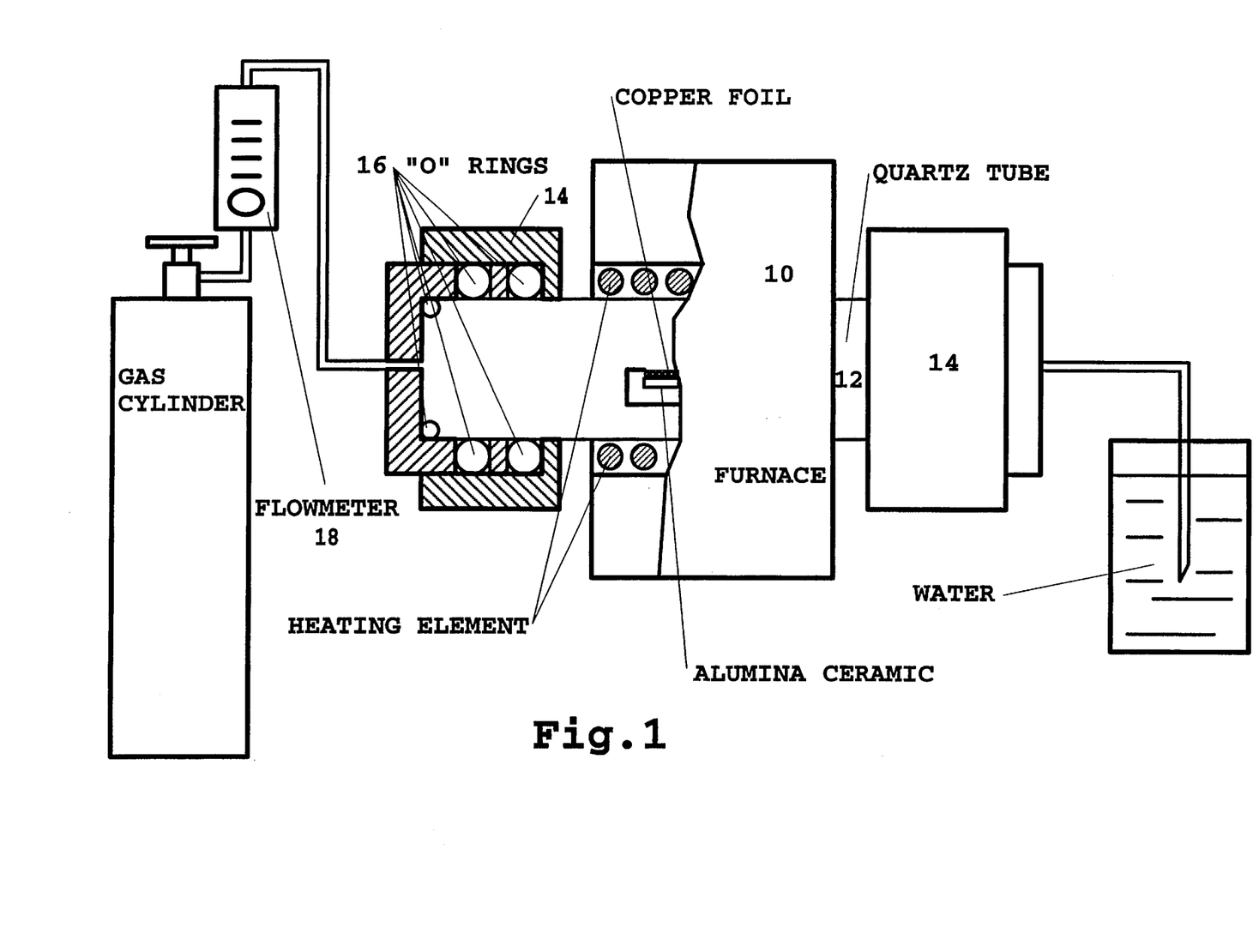
FIG. 1 is a schematic drawing illustrating the process equipment used to practice the bonding method of the present invention using a furnace.

The apparatus used to carry out the experimental procedure for the direct bonding of copper with alumina ceramic using a furnace (10) is illustrated in FIG. 1. The furnace (10) is a "winged tube furnace" manufactured by G S Lindberg/ Blue M, a unit of General Signal, having a maximum temperature of 1200° C. and 4,240 watts power. Disposed inside the furnace (10) is a quartz tube (12) fifty inches in length with a two inch inside diameter. The tube (12) is closed to the outside atmosphere by a mechanical seal (14) with three "O rings" (16) at each end. For the same reason, the exhaust is immersed in water. The gas flowmeter (18) used was manufactured by Brooks Tube Co., and has a range of 0.1 to 1.0 cubic foot per hour. The gases used in the various runs were nitrogen with 5% atomic mass of oxygen and another two with 99.998% volumic nitrogen and 99.999% volumic argon. Two types of copper foil of 99.9% purity were used, one with 0.254 mm thickness and another with 0.635 mm thickness. The pieces of alumina ceramic were 63.7×17×2.54 mm (96% purity); 63.6×17×2.54 mm (99% purity) and 25.4×25.4×1.4 mm (99% purity).

The direct bonding process with the furnace was started at either 30° C. or 240° C. The quartz tube was purged with nitrogen (5% a.w. oxygen and 0.05% a.w. water in nitrogen) from the cylinder at a flow rate of 2.3 l/hr. and a gas pressure of 15 lbs./in$^2$. Above 1065° C., the temperature was allowed to rise to 1072° C., where it remained for 15 minutes for the 0.254 mm copper foil and for 30 minutes for the 0.635 mm copper foil and the flow rate was maintained at 2 l/hr. Below 1072° C., the flow rate was 2.3 l/hr. The shape of the bonded copper member was found to be substantially the same as that of the original unbonded copper. However, there was very little evidence of oxidation. The best results were obtained with two gas cylinders, one with argon of 99.999% purity and the other containing nitrogen of 99.998% purity. In both cases, the flow rate of 1.42 l/hr. was maintained all the time and a short cooling time of approximately 25 minutes between 1072° C. and 200° C. was used. These samples did not show significant visible evidence of oxide on the copper surface. Experiments showed that the uniform mixture of nitrogen or argon with a low percentage of oxygen (0.0001 molar percent or more) in the same cylinder, a low rate of gas flow (approximately 1.4 l/hr.) and a short cooling time (25 minutes or less) were the most important factors for obtaining good bonding of copper on the ceramic without oxidation. This study investigated a possible method to reduce or to eliminate the oxidation found in the traditional furnace process. In fact, it was found that the same results as obtained by the vacuum procedure [3] was obtained using a regular furnace, a gas supply of ultrahigh-purity grade nitrogen or ultrapure carrier grade argon, and a flowmeter.

EXAMPLE 2

Example 2 describes a method of direct bonding of copper to alumina ceramic using a $CO_2$ laser (10.6 microns wavelength) in pulsation mode with a pulse period of 25 ms, a pulse width of 1.2 ms and approximately 80 watts power and a beam area of 0.361 cm$^2$ (power density) 0.22 KW/cm$^2$). The gas combination is nitrogen with oxygen. The processing time is decreased to less than one-third compared with the method using a furnace.

Figure 2:
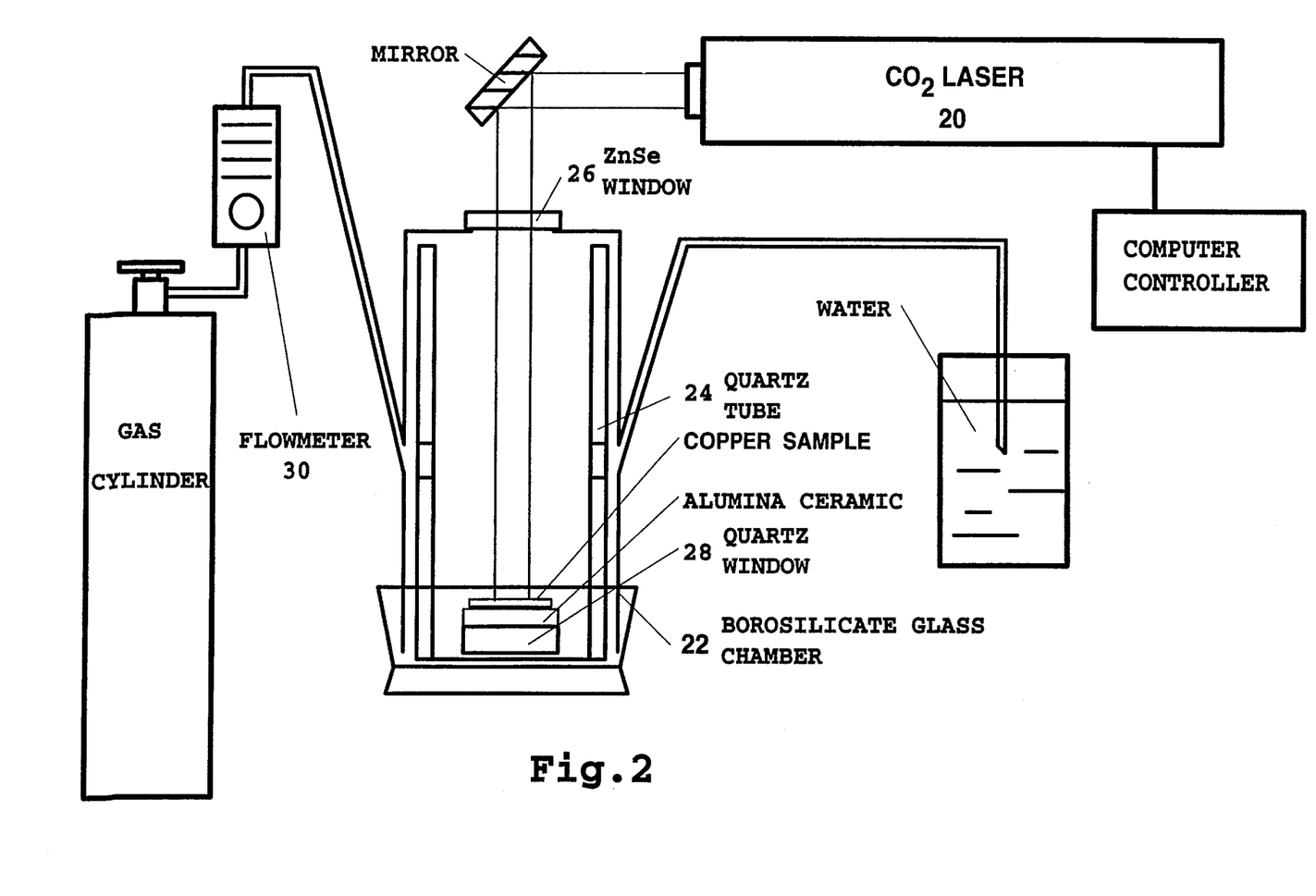
FIG. 2 is a schematic drawing showing the equipment for bonding using a laser beam.
Figure 3:
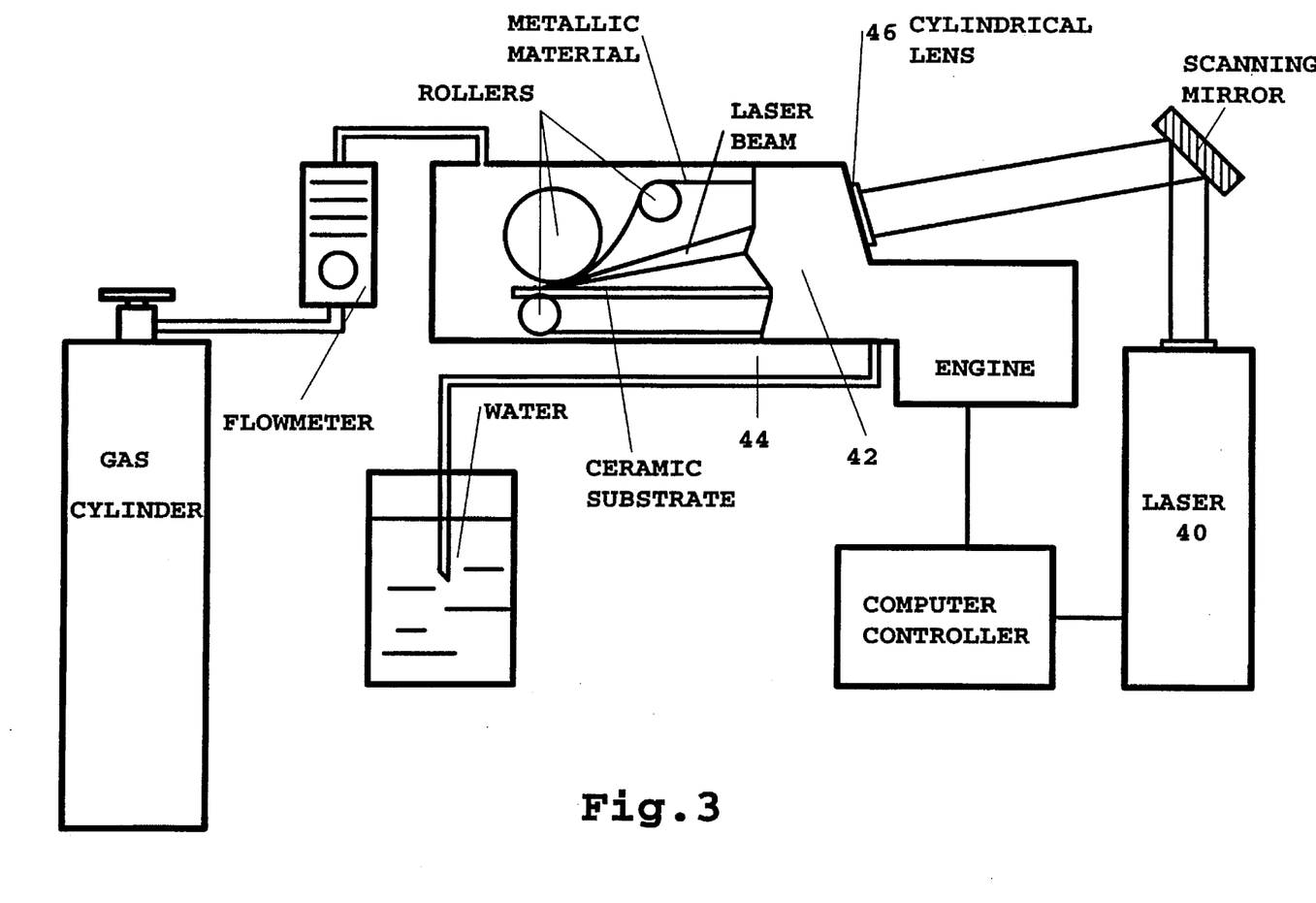
FIG. 3 is a schematic drawing illustrating the equipment used for continuous pattern bonding using a laser beam.
Figure 4:
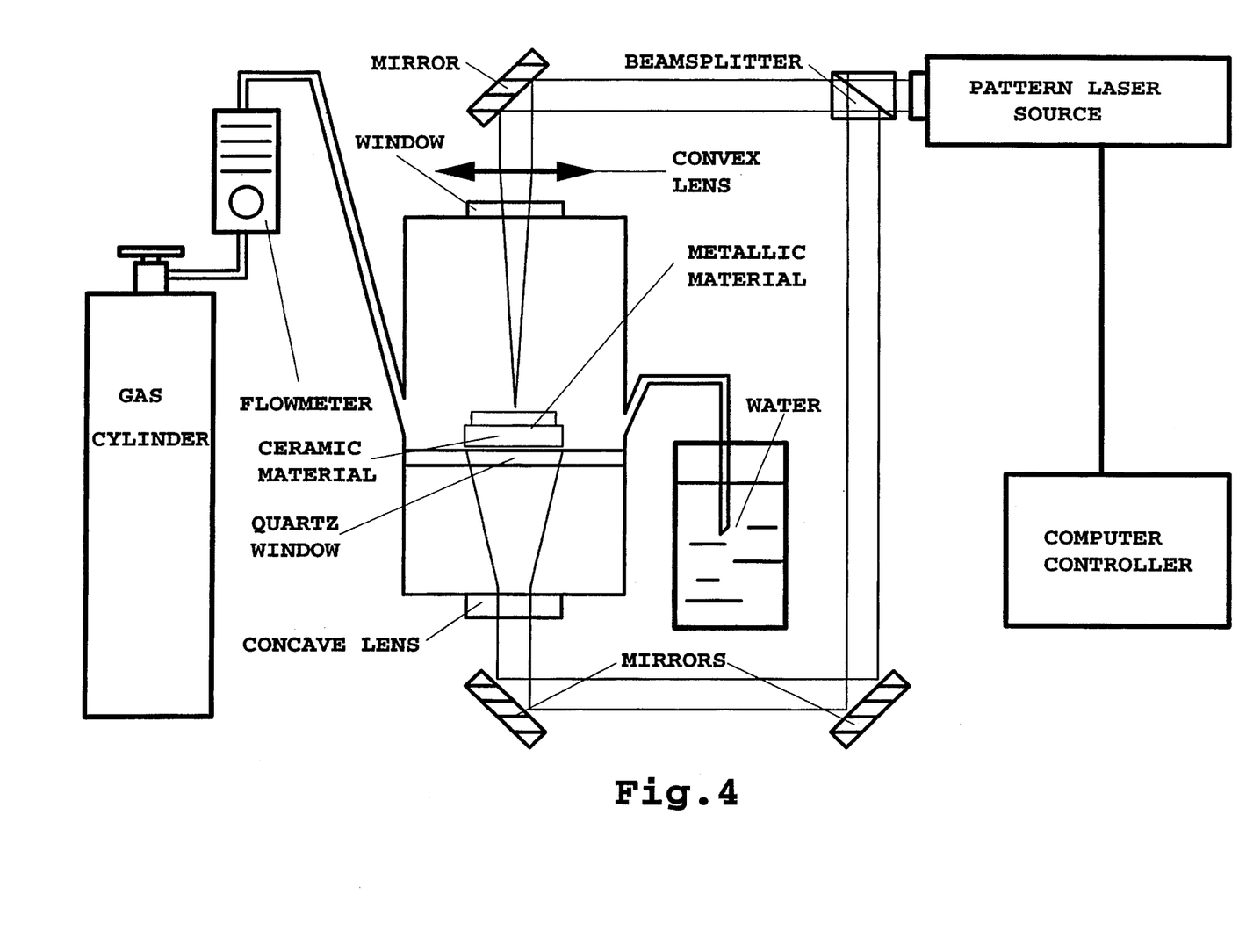
Figures 5A, 5B:
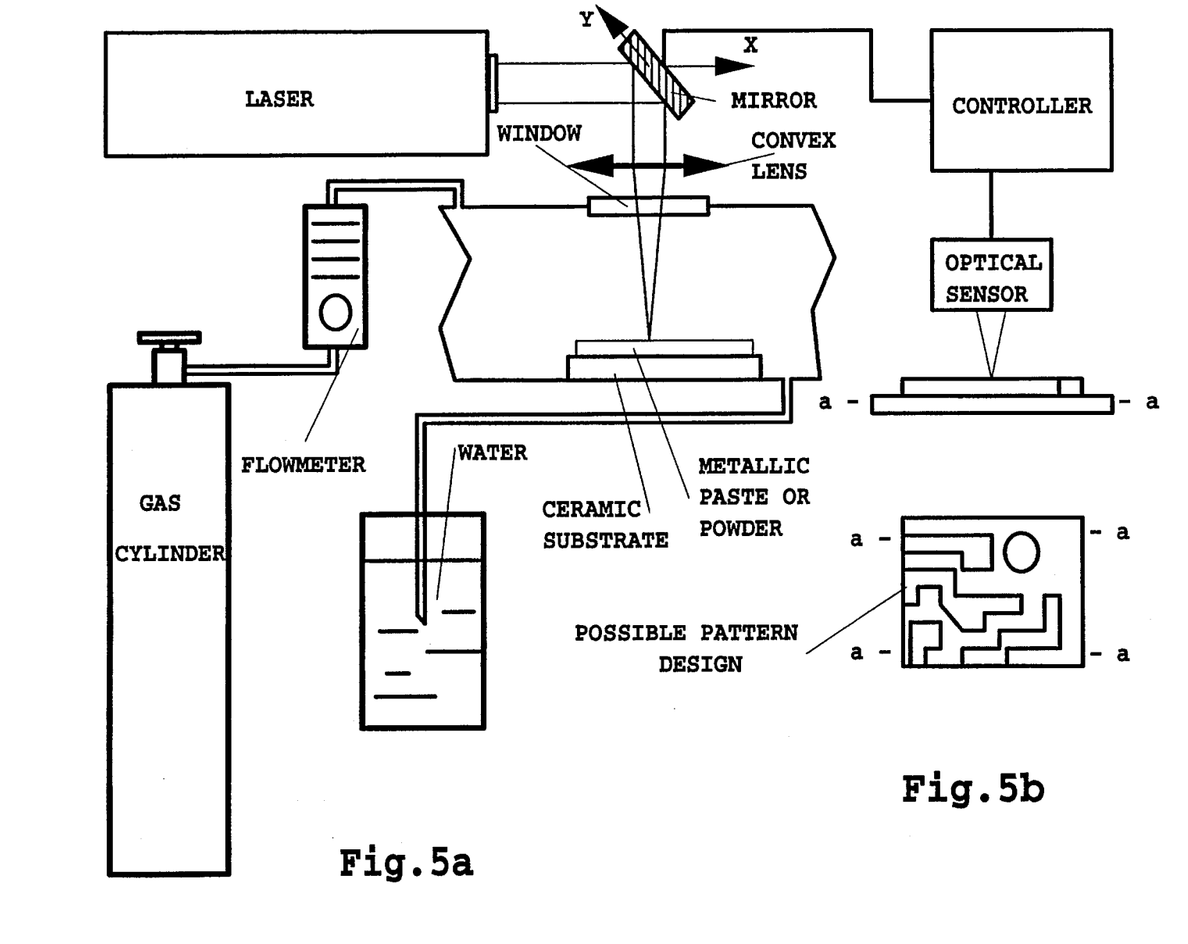

The apparatus used for direct bonding of copper foil with alumina ceramic using a laser beam is illustrated in FIG. 2. The laser (20) employed was the $CO_2$-type EVERLASE S51 with 10.6 microns wavelength and 1500 watts rated power. The transverse electromagnetic (TEM) mode was used and the beam was 11 mm in diameter. For this experiment a borosilicate glass chamber (22) was used with a quartz tube (24) inside for protection. A ZnSe window (26) 2 mm thick and 25.4 mm in diameter is located at the top of the chamber (22) and a quartz window support (28) is provided for the samples. Tubes introduce and exhaust gas from the chamber (22)—the exhaust being immersed in water. A computer data acquisition program was used to control the laser heating regime for direct bonding of copper foil on ceramic substrates using a laser beam. The gas used was nitrogen 99.998% purity. The flowmeter (30) that was used was from the Porter Instrument Co. and had a range of 0.55 to 7.76 liters/min. The 99.9% purity copper foil was 0.254 mm thick.

The objective of this investigation was to obtain direct bonding of copper with alumina ceramic using a laser beam. The biggest problem was that the ceramic was very easily broken under the laser beam. Based on experience, it was concluded that the continuous wave (CW) condition of the laser beam damaged the ceramic at a power level as low as 200 watts in less than 5 seconds for the alumina ceramic of 99% purity and 1.4 mm thickness. Based on the literature and a number of failures, it was concluded that it was important to have a procedure that developed the temperature of the ceramic in an approximately linear manner. The solution was to open the laser shutter for one second, close it for four seconds, open it for two seconds, close it for four seconds, open it for three seconds, etc. A computer data acquisition program controlled the opening and closing of the laser shutter in 20 steps. Because the cooling rate of the gas (nitrogen 99.998% purity with the flow rate of 1.45 l/min.) was found to introduce a supplementary stress in the ceramic, the solution was to close the exhaust from the glass chamber and to stop the gas flow from the gas cylinder after 5 seconds allowing the gas to achieve an increased pressure inside the chamber. A quartz window (28) was used to support the samples and was chosen for its dielectric and thermal properties; furnace bricks and alumina fabric were found to be less satisfactory. To increase the coefficient of absorption of the laser radiation on copper, the copper foil was covered with a thin layer (300 nm.) of $Cu_2O$ (sputter deposited). $Cu_2O$ powder was prepared and used to cover the copper powder found on the top of the ceramic samples. The $CO_2$ laser was operated in the pulsed mode with a pulse period of 25 ms., a pulse width of 1.2 ms. and power of approximately 80 watts. The following categories of samples were processed with the laser beam:
1) alumina ceramic covered with copper powder with $Cu_2O$ on top;
2) alumina ceramic and copper foil of 0.254 mm thickness with $Cu_2O$, 300 nm thick, on top;
3) alumina ceramic and vacuum deposition of copper 1.5 microns thick with $Cu_2O$, 300 nm thick, on top; and
4) alumina ceramic and vacuum disposition of copper 2 microns thick with $Cu_2O$ 300 nm thick, on top.

For all the above categories a computer program controlled the laser shutter to open 20 times for selected duration which were separated by chosen intervals. All four types of the above samples were bonded.

The results obtained for the above categories of samples are: in category 1) samples the area of bonding was small and varied between 4 $mm^2$ and 30 $mm^2$ because of poor control of the thickness of the copper and the $Cu_2O$ powder. The category 2) samples were virtually the same as those obtained with the furnace (except for the $Cu_2O$ on top) and the area of bonding varied between 30 $mm^2$ and 60 $mm^2$. Category 3) and 4) samples were well bonded because of the uniform and close contact between the copper and the ceramic before exposure to the laser beam; the area of bonding was approximately 160 $mm^2$. In all the sample categories, increases were observed in the $Cu_2O$ layer on top after the bonding process. The processing time was decreased to less than ⅓ compared with the method using a furnace.

EXAMPLE 3

Example 3 describes a method of drawing a copper bonding pattern on the ceramic using a $CO_2$ laser (10.6 microns wavelength) in continuous mode with power between 20 to 24 watts beam diameter 0.5 mm (power density between approximately 10.2 $KW/cm^2$ and 12.2 $KW/cm^2$ and using a copper powder of less than 100 mesh. The gas combination was the same as in Example 2, nitrogen with oxygen. The bonding method with the laser has the advantage of drawing a copper bonding pattern on the ceramic with a promising technologic-economic future.

Figure 9:
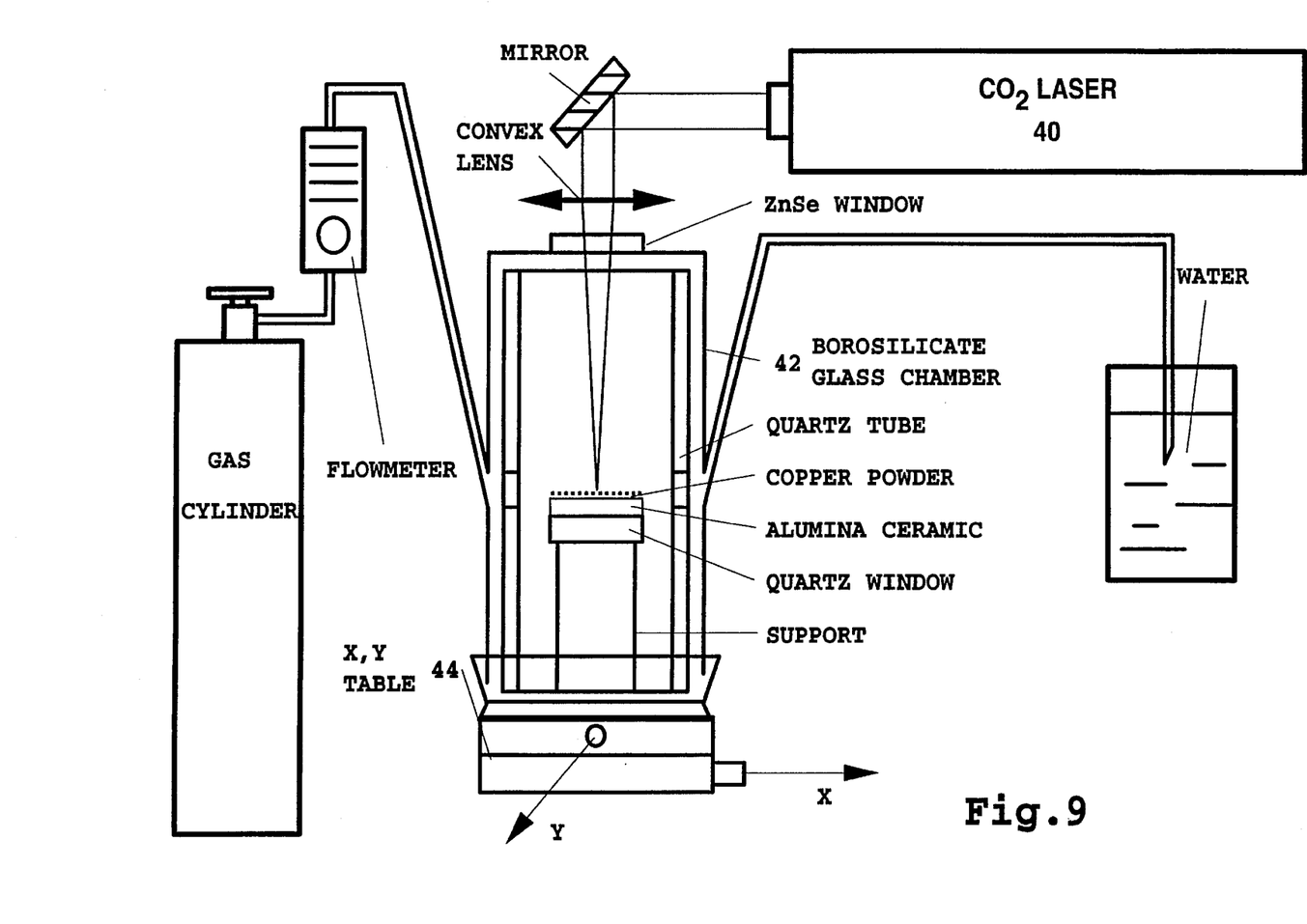
FIG. 9 is a schematic drawing illustrating the equipment used for pattern bonding using a $CO_2$ laser.

The apparatus used for a pattern of direct bonding of copper to a ceramic substrate is illustrated in FIG. 9. A $CO_2$ laser (40) (ADKIN from Costa Mesa, Calif.) with 10.5 micrometers wavelength and 100 watts rated power was used. The TEM mode was used for this experiment. A borosilicate glass chamber (42) with the exhaust immersed in water was used. Under the glass chamber (42), a two dimensional transmission stage (44) was used. The gas used was nitrogen of 99.998% purity. For this experiment a ZnSe convex lens (46) with 7.5 in. focal length was used to focus the beam over the copper powder inside the glass chamber (42). The 99.8% purity copper powder was less than 100 mesh. The alumina ceramic used was 99% purity and with dimensions 25.4×25.4×1.4 mm.

Figure 8:
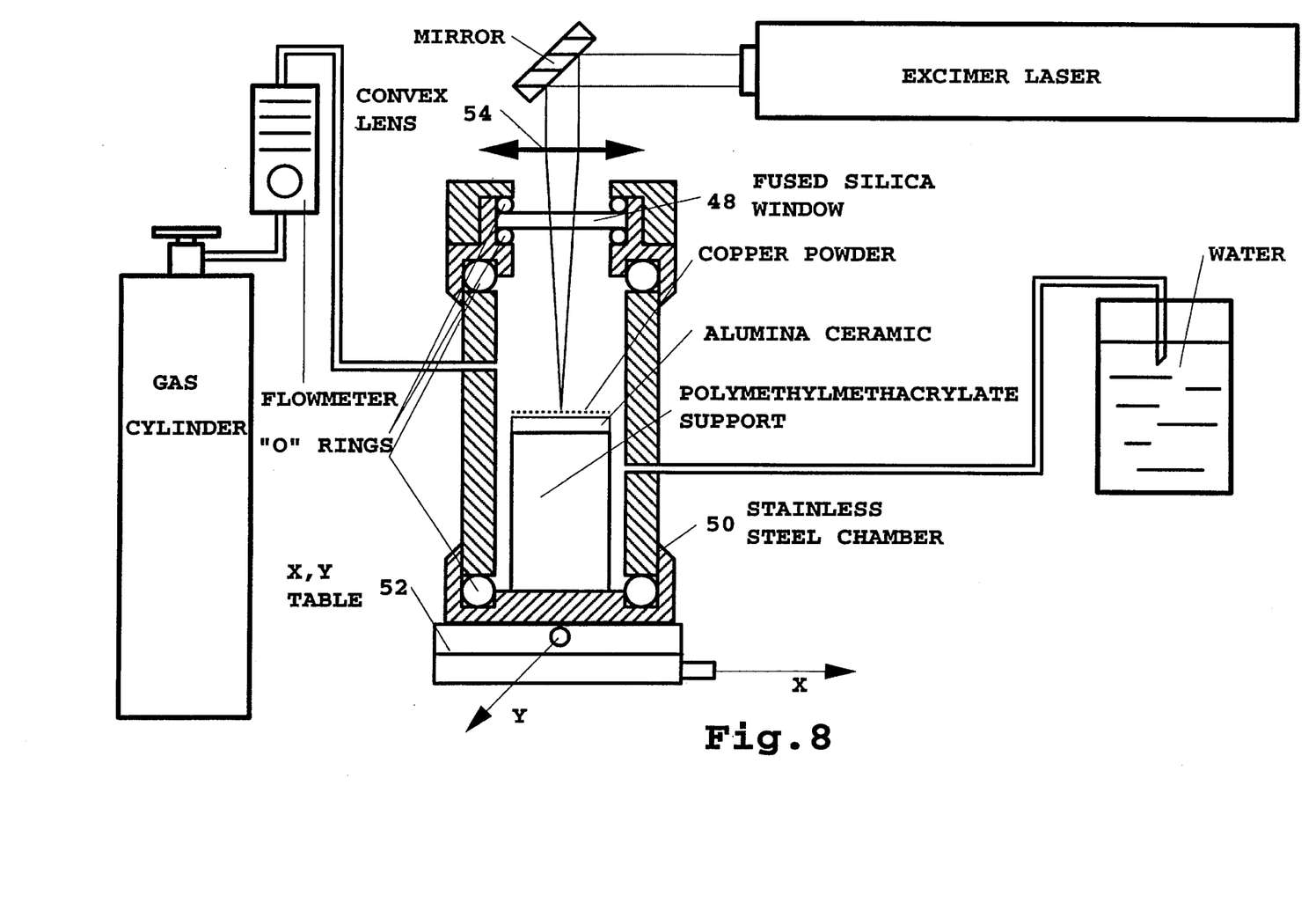
FIG. 8 is a schematic drawing illustrating an equipment arrangement for pattern bonding using an excimer laser.

For pattern direct bonding of copper powder on ceramic substrate, the nitrogen (with 5% a.w. oxygen and 0.5% a.w. water) gas flow was 2 l/h, and the gas was allowed to flow four to five minutes before laser illumination was begun. The idea was to eliminate possible oxygen contamination from the outside atmosphere. The $CO_2$ laser (40) was operated in continuous mode with power between 20 to 24 watts. After focusing, the beam had a dimension of 0.5 mm in diameter, and this corresponds to the pattern width of the directly bonded contact region for the case of copper powder on alumina ceramic. There exists a strong relationship between the power density of the laser beam and the required speed of movement of the sample for the same thickness of the copper powder layer and the same quality and dimensions of alumina ceramic. Excessive speed tends to yield a discontinuous or partial bonding, and low speed can possibly result in cracking and breaking of the ceramic. In fact, the limitation of minimum pattern width is related to the minimum size of the beam spot obtainable and to the maximum dimension of the copper powder particles and to the power density in the beam spot. In the above experimental conditions, the best results were obtained with the speed of movement of the samples approximately 0.5 mm/s. For copper powder of 1–5 micron particle size and 99.99% purity, the best results were obtain with $CO_2$ laser power of 20.5 watts (power density of 10.44 $KW/cm^2$) and a speed of 0.5 mm/s. For 316 stainless steel powder of less than 325 mesh, the best results were obtained with 28.5 watts laser power, 1 mm beam diameter (power density 3.629 $KW/cm^2$) and a speed of 0.3175 mm/s. An excimer laser type KrF (248 nm wavelength SERIES 2000 manufactured by Questek, Inc. (FIG. 8) was used for copper powder of 1 to 5 microns. A stainless steel chamber with a synthetic fused silica window (48) with the exhaust immersed in water was employed. Under the stainless steel chamber (50), a two-dimensional transmission stage (52) was used. The gas used was nitrogen of 99.998% purity at a flow rate of 2.3 l/hr and a gas pressure of 15 lbs/$in^2$. For this experiment, a synthetic fused silica convex lens (54) with 0.5 m focal length was used to focus the beam over the copper powder inside the stainless steel chamber (50). The 99.99% purity copper powder was between 1 and 5 microns in particle size. The alumina ceramic used was 99% purity and with dimensions 25.4×25.4×1.4 mm. The best results were obtained for a laser pulse energy of 0.2 J, a repetition rate of 25 pps to 30 pps (pulses per second), a beam area of 5.75 $mm^2$ (power density of approximately 3.5 $J/cm^2$) and with a speed of movement of the samples of approximately 0.2 mm/s.

FIGS. 4, 5a, 5b, 8 and 9 illustrate alternate apparatus arrangements, using movement of the laser beam and/or the contacting region of metal and ceramic, suitable for pattern bonding using a laser beam. The representations of the laser beam and/or samples in FIGS. 4, 5a, 5b, 6, 8 and 9 are not to be construed as limiting of the possible implementation of the relative movement of laser beam and/or sample, but are given as illustrations only.

Figure 6:
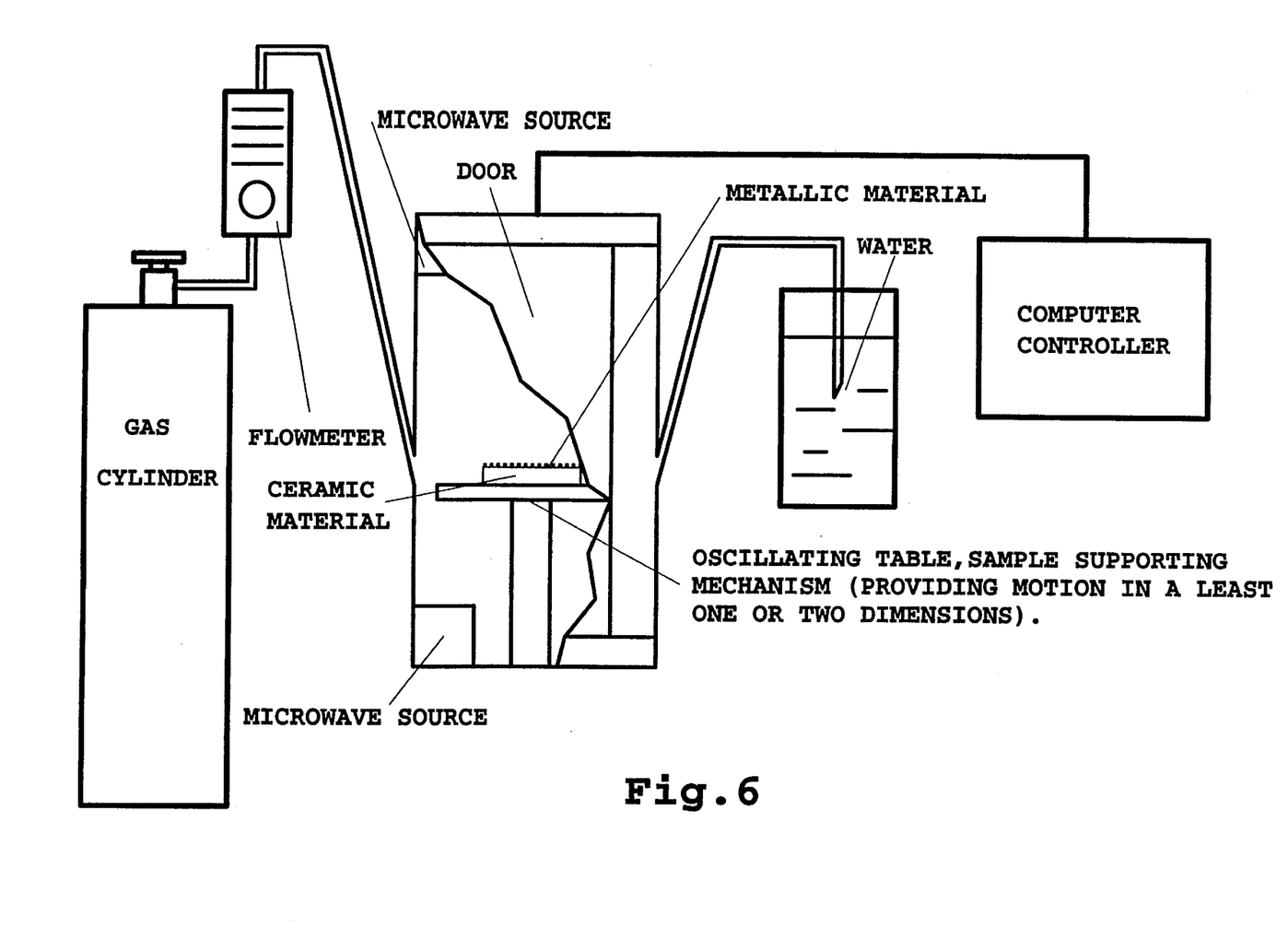
FIG. 6 is a schematic drawing illustrating the equipment used for bonding in a microwave cavity.
Figure 7:
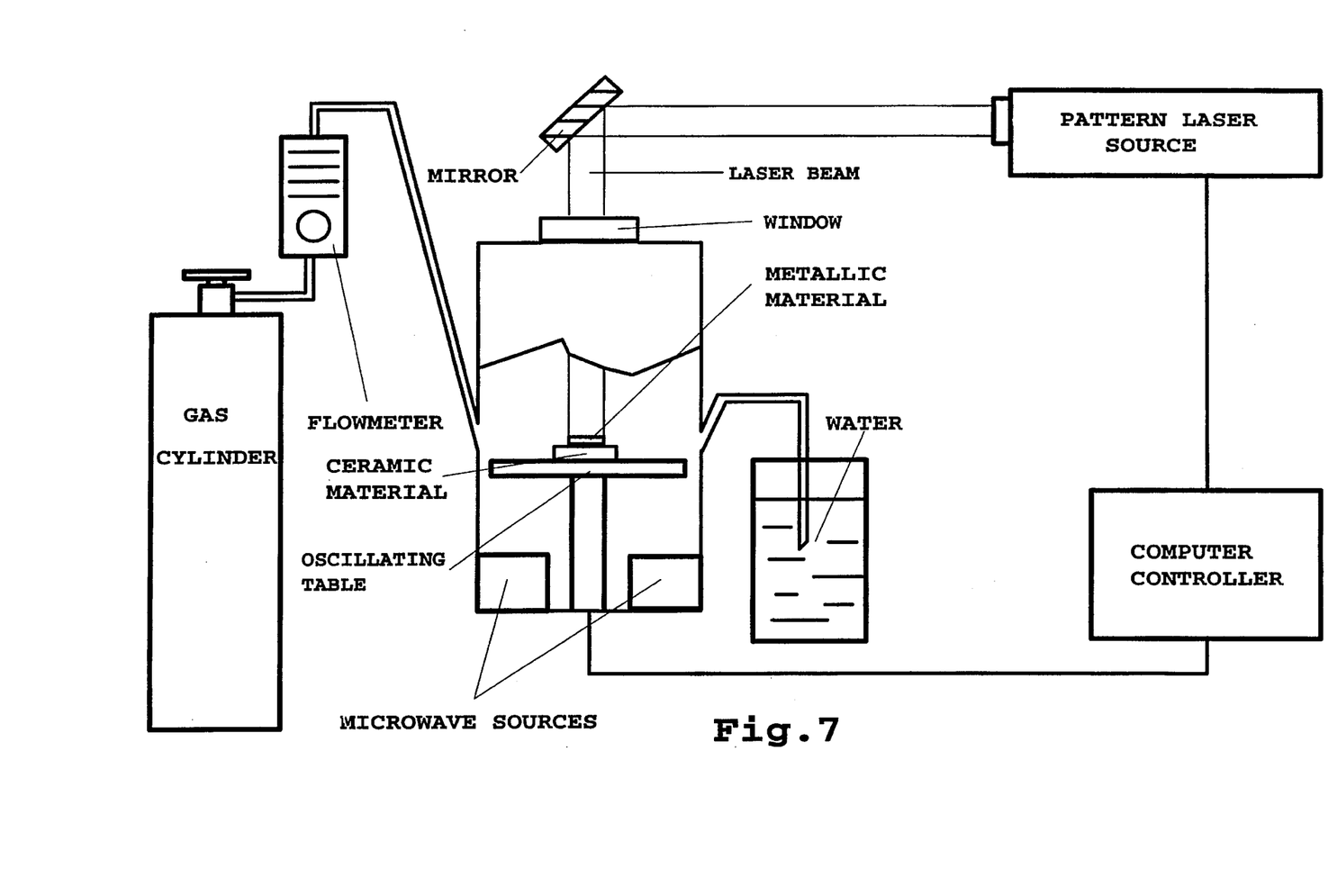
FIG. 7 is a schematic drawing, illustrating the equipment used for bonding using both a laser beam and a microwave source.

Other heating sources such as radiant heaters, conventional ovens, microwave ovens, and combinations of heating methods may be used to practice the method of the present invention. FIG. 6 illustrates the use of a microwave oven, and FIG. 7 shows the use of a laser in combination with a microwave source.

Also, it is to be understood that various metals, in bulk, powder, paste, or other forms and non-metal substrates may be used other than those described in the Examples. Metals such as aluminum, chromium, cobalt, copper, iron, gold, molybdenum, nickel, silver and alloys thereof may be used. Eutectics such as chromium-oxygen, cobalt-oxygen, iron-oxygen, nickel-oxygen, chromium-sulfur, copper-sulfur, silver-sulfur, copper-phosphorus, silver-phosphorus, aluminum-silicon, molybdenum-silicon or alloys of chromium, cobalt, iron, nickel, copper, silver, aluminum and/or molybdenum in eutectic with oxygen, sulfur, phosphorus, or silicon combinations may be formed. Alumina, beryllia, fused silica, titanates, and spinels and other ceramics may be used as the non-metallic substrate.

The process of the present invention is distinguished from previously reported methods of bonding metallic materials to ceramics, because it employs a wider variety of heating sources and specific atmospheric conditions. Heating the reactants is accomplished by using energy sources such as laser beams, radiant heaters, microwaves, conventional furnaces, ovens, or by using some combination of these heating methods. When high power beams are employed, heating rates are controlled by switching the beam on and off to control the heating rate.

In addition, the method improves upon previously reported methods of bonding copper to alumina, for example, by reducing the oxygen content present in the atmosphere of the reaction chamber, and by the elimination of the need for heating in a vacuum chamber.

Copper was bonded to alumina using either a furnace or a laser beam. The oxygen concentration in nitrogen or argon atmosphere was less than 0.001 molar percent. The reaction temperature selected from the copper-oxygen phase diagram was in the range between 1065° and 1080° C.

Two advantages of employing the laser heating are that the heating rate is much greater, which reduces the total processing time; and that the laser beam can be used to form patterns, including high resolution features of copper bonded to the ceramic surface. The methods of using a laser beam should be particularly useful in the electronics industry, which requires different kinds of patterns for electronic circuits.

Thus, it can be seen that at least all of the stated objectives have been achieved.

Obviously, many modifications and variations of the present invention are possible in light of the above teachings. It is therefore to be understood that, within the scope of the appended claims, the invention may be practiced otherwise than as specifically described.

APPENDIX

1. "Method of Direct Bonding Metals to Non-Metallic Substrates", Babcock, et al, U.S. Pat. No. 3,766,634, Oct. 23, 1973.
2. DE-OS 2,319,854
3. DE 3,036,128 A1
4. "Laser Machining and Welding", N. Rykalin, A. Uglov, A. Kokora (Moscow 1975).
5. "Hyperbolic Heat Conduction Due to a Mode Locked Laser Pulse Train", L. G. Hector, Jr., W. S. Kim, M. N. Ozisik, *Int. J. Eng. Sci*, Vol. 30, No. 12, pp. 1731–1744, 1992.
6. "Microstructure and Phase Selection in Laser Treatment of Materials", W. Kruz and R. Trivedi.
7. "Effeto di Depositi Superficiali Sulla Saldatura a Laser di Laminatidi Rame", G. Daurelio, N. Ammannati, *La Metallurgia Italiana*, Vol. 83, n 7–8/, 1991.
8. "Growth Kinetics of Oxide Films and Their Effect on Absorption of IR Radiation", A. A. Uglov, A. A. Volkov, et al, *Spektrosk*, 68, pp. 640–645, March 1990.
9. "Influence of Oxygen on Dynamic Recrystallization During Hot Working of Polycrystalline Copper", N. Ravichondon and Y. V. R. K. Parsad, *Mat. Sci. and Eng.*, A156, pp. 195–204, 1992.
10. "Metal Fusion by Laser Radiation Action in an Oxidizing Medium", A. A. Uglov, A. A. Volkov, et al, Plenum Publishing Corp., 0022-0841/91/6101-0811, 1990.
11. "Calculating Kinetics of Oxide Film Growth During Laser Heating", A. A. Uglov, A. A. Volkov, et al, Plenum Publishing Corp., 0022-0841/91/6101-0811, 1990.
12. "Laser Processing of Ceramics", H. K. Tonshoff and C. Emmelman.
13. "Laser Applications in Metalworking", John F. Ready.
14. "Experimental Heat Flow in Laser Beam Welding", E. A. Metzbower.
15. "Laser Surface Treatment of Copper", C. Panagopoulos, A. Michaelides, *Journal of Materials Science* 27, pp. 1280–1284, 1992.
16. "Laser Deposition of Copper Oxide Thin Films; Contrast withSputtering", C. Oritz, C. N. Alfonso, et al, *Applied Surface Science*, 54, pp. 201–204, 1992, North-Holland.
17. "Laser Induced Deposition of Copper and Lead Powders", D. Narasimharo, S. V. Babu, et al, *J. Mater. Res.*, Vol. 7, No. 5, May 1992.

We claim:

1. A method of directly bonding a metal to a non-metallic substrate, comprising the steps of:
    a. placing a metal in contact with a non-metallic substrate;
    b. in the presence of a reactive gas, directly heating said metal by applying energy thereto by use of a laser, such that said reactive gas and metal form a eutectic which simultaneously wets the metal and non-metallic substrate at at least one point of contact therebetween;
   such that said metal and non-metallic substrate are caused to be bonded to one another.

2. A method of directly bonding a metal to a non-metallic substrate as in claim 1, which further comprises the step of cooling said bonded metal and non-metallic substrate in a manner such that said metal and non-metal bond is not broken.

3. A method of directly bonding a metal to a non-metallic substrate as in claim 2, in which said cooling step is essentially uniformly carried out over a period of approximately thirty (30) minutes.

4. A method of directly bonding a metal to a non-metallic substrate as in claim 1, which further comprises the use of a technique selected from the group consisting of the use of a microwave cavity and the use of infrared heating and the use of a second laser, including combinations thereof, to apply heating energy to said metal and/or said non-metallic substrate.

5. A method of directly bonding a metal to a non-metallic substrate as in claim 1, which further comprises the step of placing said metal upon said non-metallic substrate in a desired pattern and bonding said metal thereto at desired points.

6. A method of directly bonding a metal to a non-metallic substrate as in claim 5, in which the step of placing a metal in contact with a non-metallic substrate involves copper.

7. A method of directly bonding a metal to a non-metallic substrate as in claim 5, in which the step of placing a metal in contact with a non-metallic substrate involves SS316.

8. A method of directly bonding a metal to a non-metallic substrate as in claim 1, in which the step of placing a metal in contact with a non-metallic substrate involves use of at least one metal selected from the group consisting of aluminum, cobalt, copper, gold, iron, molybdenum, nickel, silver, SS316 and alloys and oxides thereof.

9. A method of directly bonding a metal to a non-metallic substrate as in claim 1, in which the step of placing a metal in contact with a non-metallic substrate involves copper.

10. A method of directly bonding a metal to a non-metallic substrate as in claim 1, in which the step of placing a metal in contact with a non-metallic substrate involves SS316.

11. A method of directly bonding of a metal to a non-metallic substrate as in claim 1, wherein the formed eutectic involves a member of the group consisting of chromium-oxygen, cobalt-oxygen, iron-oxygen, nickel-oxygen, chromium-sulfur, copper-sulfur, silver-sulfur, copper-phospherous, silver-phospherous, aluminum-silicon, molybdenium-silicon, and alloys of the group consisting of chromium, cobalt, iron, nickel, copper, silver, aluminum and molybenium in eutectic with at least one member of the group consisting of oxygen, sulfur, phospherous and silicon.

12. A method of directly bonding of a metal to a non-metallic substrate as in claim 1, in which the non-metallic substrate selected from the group consisting of alumina, beryllia, silica, spinels, titanates and combinations thereof.

13. A method of directly bonding of a metal to a non-metallic substrate as in claim 1, in which the step of directly heating said metal by applying energy thereto by use of a laser is effected by utilization of a laser system selected from the group consisting of $CO_2$ and Eximer lasers.

* * * * *